(12) United States Patent
Dibble et al.

(10) Patent No.: US 7,176,831 B2
(45) Date of Patent: Feb. 13, 2007

(54) EMITTER LOCATION SYSTEM

(75) Inventors: Anthony Sidney Dibble, Christchurch (GB); Glyn Wyman, Filton (GB)

(73) Assignee: Selex Communications Limited, Essex (GB)

( * ) Notice: Subject to any disclaimer, the term of this patent is extended or adjusted under 35 U.S.C. 154(b) by 352 days.

(21) Appl. No.: 10/474,739

(22) PCT Filed: Jan. 30, 2003

(86) PCT No.: PCT/GB03/00409

§ 371 (c)(1),
(2), (4) Date: Oct. 14, 2003

(87) PCT Pub. No.: WO03/069367

PCT Pub. Date: Aug. 21, 2003

(65) Prior Publication Data

US 2004/0233100 A1 Nov. 25, 2004

(30) Foreign Application Priority Data

Feb. 15, 2002 (GB) .................. 0203621.8

(51) Int. Cl.
*G01S 5/14* (2006.01)
*G01S 3/02* (2006.01)

(52) U.S. Cl. .............................. 342/357.06; 342/357.1; 342/451; 342/465

(58) Field of Classification Search ........... 342/357.06, 342/357.01, 450–452, 457, 465
See application file for complete search history.

(56) References Cited

U.S. PATENT DOCUMENTS 6,249,252 B1 * 6/2001 Dupray ....................... 342/457

FOREIGN PATENT DOCUMENTS

| EP | 0 982 964 A2 | 8/1999 |
| EP | 1 022 589 A1 | 1/2000 |
| JP | 10-84571 | 3/1998 |
| JP | 2002-33699 | 1/2002 |
| WO | WO 98/10307 | 9/1997 |
| WO | WO 01/26250 A1 | 8/2000 |

(Continued)

OTHER PUBLICATIONS

W. Schafer et al., Propagation characteristics of short-range radio links at 60 GHz for mobile intervehicle communication, SBT/IEEE International Telecommunications Symposium Record, p. 212-216, Sep. 1990.*

(Continued)

*Primary Examiner*—Thomas H. Tarcza
*Assistant Examiner*—Fred H. Mull
(74) *Attorney, Agent, or Firm*—Martin Fleit; Paul D. Bianco; Fleit Kain Gibbons Gutman Bongini & Bianco, P.L.

(57) ABSTRACT

Described herein is a system and method for detecting the position of a remote emitter (1) where the emitter (1) is emitting a radio frequency signal (2) in a radio field (3). The system and method uses at least one receiver (4) which is moveable within the environment of the radio field (3), each receiver (4) measuring and recording the amplitude of the radio frequency signal (2) and recording its precise location using a GNSS or GPS receiver. The data recorded is processed and compared to data predicted by the receiver(s) (4) to estimate a location of remote emitter (1).

8 Claims, 2 Drawing Sheets

FOREIGN PATENT DOCUMENTS

WO         WO 01/28272 A1      9/2000

OTHER PUBLICATIONS

R. Prasad et al., Performance evaluation of microcellular systems with shadowed Rician/Rayleigh faded multiple co-channel interferers, IEEE 42nd Vehicular Technology Conference, vol. 1, p. 427-430, May 1992.*

D. Har et al., Effect of the local propagation model on LOS microcellular system design, Proceedings of Fifteenth Annual Joint Conference of the IEEE Computer Societies (INFOCOM), vol. 2, p. 451-456, Mar. 1996.*

A.F. De Toledo, Estimating coverage of radio transmission into and within buildings at 900, 1800, and 2300 MHz, IEEE Personal Communications, vol. 5(2), lines 40-47, Apr. 1998.*

English translation of JP 10-84571.*

* cited by examiner

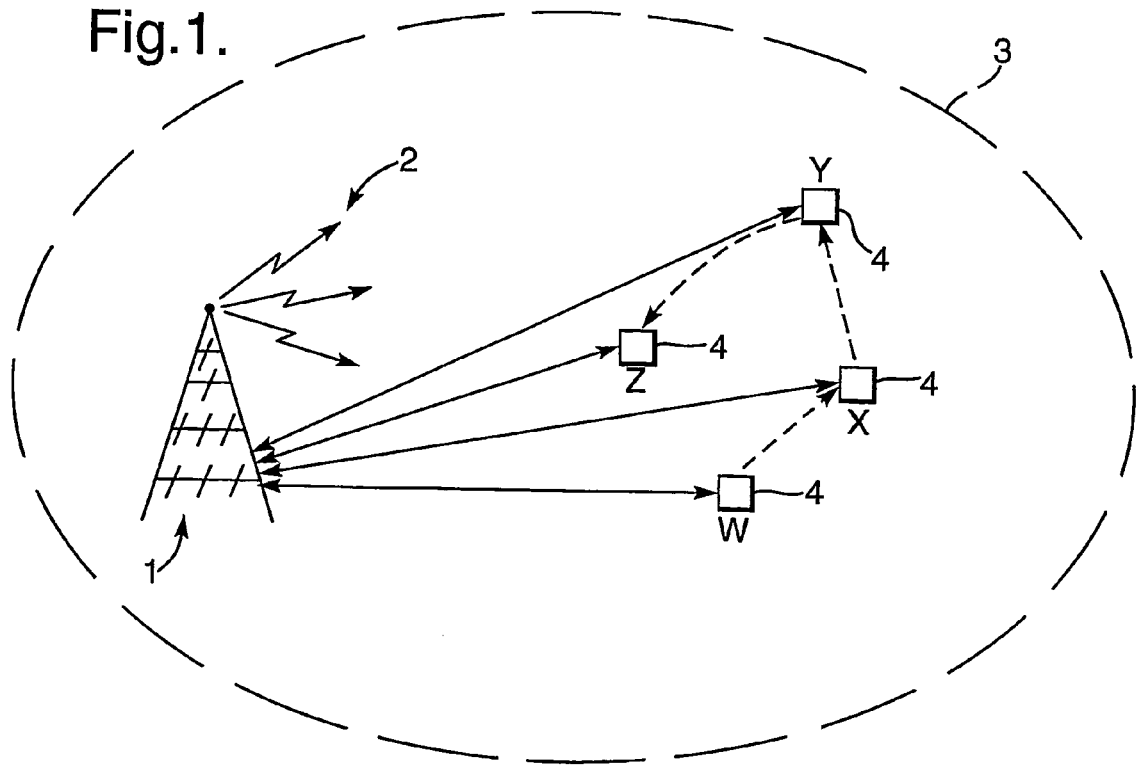
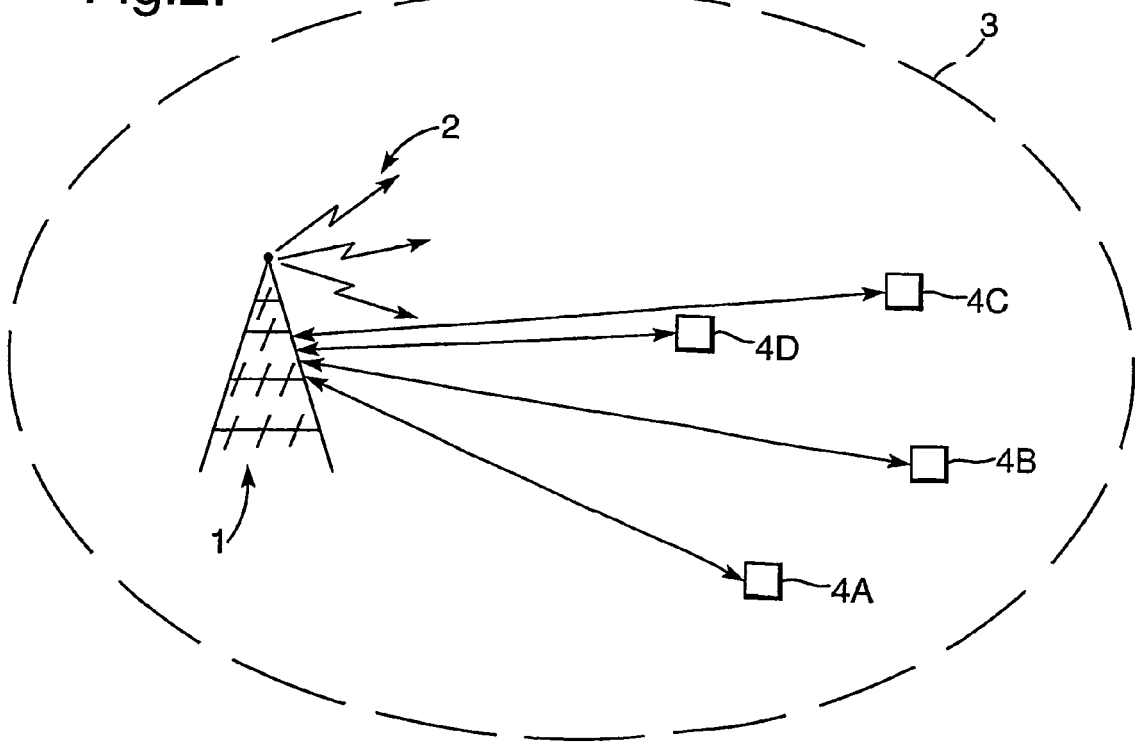

EMITTER LOCATION SYSTEM

FIELD OF THE INVENTION

The present invention relates to an emitter location system and is more specifically, but not exclusively, related to a system for locating a remote emitter from a number of measurements of signal strength acquired from a receiver position without requiring any knowledge of the propagation environment.

BACKGROUND OF THE INVENTION

In a mobile telecommunications network, for example, it may be necessary to locate the position of a mobile telephone transceiver or handset within a given cell of the network. A system is known whereby a small number of cell sites within the network are used to measure the amplitude of the signal emitted by the user's mobile telephone handset. The set of amplitude data is then compared with a pre-existing set of reference data, which is generated by moving a transmitter to all points in a grid of locations within the coverage area of the network. By comparing the data set obtained by measuring the amplitude of the signal of the actual mobile telephone handset with the reference data set, is an estimation of the location of the mobile telephone handset, and hence the user, can be obtained. Such a system is described in GB-A-2 352 134, GB-A-2 291 300, GB-A-2 311 697, WO-A-98/15149 and EP-A-0 133 378.

This system is particularly used to locate users who, for some medical reason, for example, have contacted the emergency services but are unable to give their precise location.

It is a disadvantage of this system that the reference set of data must have been generated in order to compare it to the signal amplitude data and hence locate the mobile telephone handset's position. Furthermore, the actual set of data may be affected by local irregularities, for example weather conditions, which are not reflected in the reference set of data.

German Offenlegungsschrift DE-A1-2849 282 discloses a system which is suitable for determining the distance between a mobile telephone and a base station and relies upon a line of sight signal. Signal strength and distance are related by a $1/r^2$ power function.

SUMMARY OF THE INVENTION

It is therefore an object of the present invention to provide an emitter location system that is capable of locating a remote emitter without requiring reference data sets to be generated. Furthermore, it is possible for the remote emitter to be located in all radio propagation conditions, for example, ranging from built-up urban areas to uncluttered rural areas.

According to one aspect of the present invention, there is provided a system for locating an emitter emitting a radio frequency signal in a radio field, the system comprising a receiver which is moveable within the environment of the radio field and is capable of detecting and recording: the amplitude of the radio frequency signal from a plurality of locations within the environment; and the position of the receiver in the radio field, the receiver also being capable of coding amplitude data and comparing that data to a series of predicted data generated by the receiver to generate a prediction of the location of the emitter.

The system may further comprise additional receivers each capable of detecting and recording the amplitude of the radio frequency signal from a plurality of locations.

Advantageously, each receiver comprises a GNSS or GPS receiver and a single element antenna.

Each receiver may continuously detect and record the amplitude of the radio frequency signal whilst moving within the environment of the radio field.

Preferably, the data is coded according to a power law.

According to another aspect of the present invention, there is provided a method of locating the position of an emitter emitting a radio frequency signal in a radio field, the method comprising the steps of:

(a) positioning a receiver in the radio field;
(b) recording the amplitude of the emitted signal at the receiver location;
(c) recording the receiver location;
(d) repositioning the receiver at a second location;
(e) recording the amplitude of the emitted signal at the second receiver location;
(f) recording the receiver location;
(g) repeating steps (a) to (f) as required;
(h) coding the data generated by steps (a) to (g) above; and
(i) comparing the coded data to data predicted by the receiver to produce a predicted location of the emitter.
(i) comparing the coded data to data predicted by the receiver to produce a predicted location of the emitter.

For a better understanding of the present invention, reference will now be made, by way of example only, to the accompanying drawings in which:

BRIEF DESCRIPTION OF THE DRAWINGS

FIG. 1 is a schematic simplified representation of an emitter located in an uncluttered rural location, emitting a radio frequency signal, the amplitude of the radio frequency signal being detected and recorded by a receiver being moved through the radio field generated by the emitter;

FIG. 2 is a schematic simplified representation showing the emitter of FIG. 1 emitting a radio frequency signal, the amplitude of the radio frequency signal being detected and recorded by a number of receivers located within the radio field generated by the emitter;

DETAILED DESCRIPTION OF THE INVENTION

Figure 3:
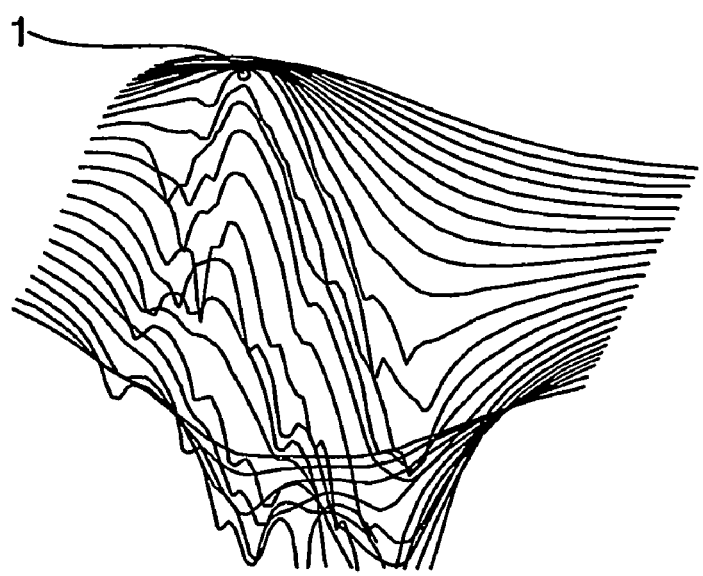
FIG. 3 is a screen-shot of the 'goodness' profile generated by a system according to the present invention, where a dot marks the predicted location of the emitter.

Referring initially to FIG. 1, a very simplified view of an emitter 1 is shown. The emitter 1 emits radio frequency signals 2 into a radio field 3. A mobile receiver 4 is moved through the radio field 3 from position W to X to Y to Z and records data at each of these locations.

The mobile receiver 4 includes a single element, omni-directional antenna capable of receiving the radio frequency signals 2 emitted by the emitter 1 and signals generated by a Global Navigation Satellite System (GNSS) or a Global Position System (GPS) receiver. The mobile receiver may be a single unit with a common antenna. Alternatively, the mobile receiver may be made up of a separate GPS receiver device (with integral or external antenna), a data logger (computer or similar) and a dedicated receiver device to detect radio frequency signals 2 from the emitter 1. In this case, all the components will be all connected together via appropriated data cables/links.

The data recorded by the mobile receiver 4 comprises the strength (i.e. amplitude) of the radio frequency signals 2 received from the emitter 1 and the position of the mobile receiver 4, which is determined from the GNSS or GPS receiver device included in the mobile receiver unit 4.

When a number of data points have been collected by the mobile receiver 4, an algorithm calculates the most likely position of the emitter 1 by applying a simple propagation model to all of the data points. The algorithm is based on differences or 'goodness of fit' between actual measurements and predicted values for all data points in the area. The predicted location of the emitter 1 will be generated when there is agreement between the predicted and measured data.

This is done by setting up a grid of points representing the area of interest. Then, for each point on the grid, the distance to each sample point is calculated and then assuming the emitter 1 has a certain power and radiation efficiency, the expected signal strength is calculated, assuming an inverse power law. For each grid point, an array of predictions for each sample point is produced. This can be summarised by the following procedure:

```
DIM grid (Xsize, Ysize, number_of_points)
FOR x = 1 TO Xsize
    FOR y = 1 TO Ysize
        FOR sample_point = 1 TO number_of_points
            distance=SQRT((convert_grid_units(data(sample_
            point).x)-x)^2
                +(convert_grid_units(data(sample_point).y)-y)^2)
            expected=10xLOG10(emitter_const/(distance^power_
            law_const))
            grid(x,y,sample_point) = expected - data(sample_point).
            sig
    NEXT y
NEXT x
```

Once completed, the array can be analysed to produce a 'Goodness' profile which is mapped to the grid. The 'Goodness' profile can be determined by the following procedure which finds the minimum difference between expected and actual values obtained:

```
DIM goodness (Xsize, Ysize)
FOR x = 1 TO Xsize
    FOR y = 1 TO Ysize
        minDiff=1E37    :REM large number
        maxDiff=0
        FOR sample_point = 1 TO number_of_points
            IF grid(x, y, sample_point) >maxDiff THEN
                maxDiff = grid(x, y, sample_point)
            ENDIF
            IF grid(x, y, sample_point) < minDiff THEN
                minDiff = grid(x, y, sample_point)
            ENDIF
        NEXT y
        goodness(x, y) = maxDiff - minDiff
NEXT x
```

Once the 'Goodness' profile is generated, the point with the best 'goodness' value can be chosen to pinpoint the location/area of the emitter 1. The sharpness of the 'Goodness' profile gives a value of confidence to the prediction. A typical 'Goodness' profile is shown in FIG. 3.

Figure 4:
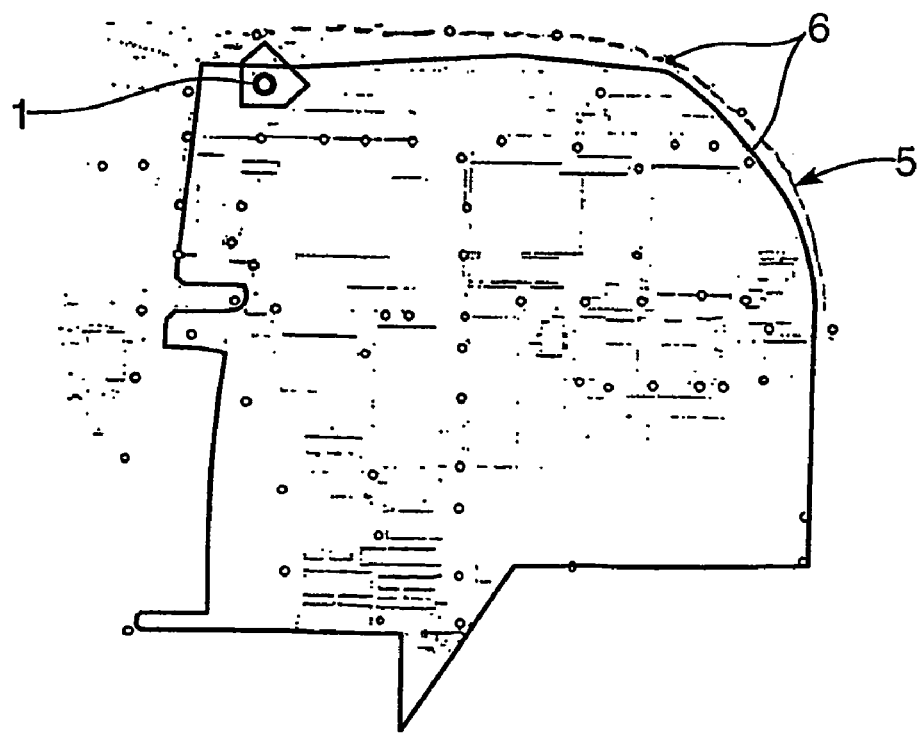
FIG. 4 is a screen-shot of a map overlaid with a single contour generated by the system according to the present invention, a circle marks the predicted location of the emitter.

The predicted location and any number of contour lines can then be overlaid onto a map of the area. FIG. 4 shows an actual prediction plus one contour line 5, and for clarity the sample points 6 used (only two of which are referenced) are also shown.

Once the location has been identified, further techniques can be applied to try to improve the accuracy of the predicted location. For example, different radiation efficiencies in different directions may be utilised to try to remove any possible 'lopsidedness' in takeoff that the emitter 1 may exhibit. For example, the emitter 1 may be emitting predominantly in one direction through an opening and may be shielded more in one direction by close objects or there may be open space to one side of the emitter 1 and tall buildings on the other.

As the algorithm uses difference rather than absolute values, many radio frequency factors are irrelevant. For example, the power of the emitter, the efficiency of the transmitting antenna, the initial shielding around the emitter and the efficiency of the receiving antenna are not required in order to produce a predicted location using this system.

For radio propagation in free space, the power received at a range from the emitter can be calculated as being proportional to the inverse square of the range. For cluttered urban propagation an inverse fourth law is commonly used. The algorithm also uses a power law used to predict the signal strength at each point. However, it was found that changes in the order of the power law only caused slight variation in the resultant location predicted. The power law can be adjusted in post processing to obtain the sharpest and most accurate response.

The algorithm has no need for information about the environment in the radio field 3, for example, presence or lack of buildings, position of buildings, radio refractive or absorption index of building materials, polar plot of the emitter radiation, polar plots of the receiving antenna. Furthermore, there is no need for map information as the emitter location is referenced back to the GNSS or GPS location.

The 'goodness of fit' for each point in the area can be determined using criteria such as, for example, smallest average difference between worst and best fit, or least scatter about a mean (standard deviation).

It is possible to combine data gathered from many different mobile platforms perhaps gathered at different times (providing the emitter has remained in the same location). FIG. 2 shows a system similar to that of FIG. 1. However, in this case there are a number of mobile receivers $4_A$, $4_B$, $4_C$, $4_D$ each recording the amplitude of the signal emitted by the emitter 1 and their respective positions using GNSS or GPS.

It is preferable that pairs of mobile receivers pass through at least one common measurement point.

Furthermore, it is advantageous that as many data points as possible are collected such that mobile flutter and fading will average out. Also, the flutter rate may be used as a measure of the local multipath environment.

If the receiver is in a moving vehicle, there is no requirement for it to stop to take measurements, and it can be advantageous to make a continuous series of measurements.

The initial algorithm used in this system assumes a fixed power law for distance. This may not be appropriate for urban or industrial environments. When close to the emitter 1, the radio frequency signals may be predominantly reflections and paths through buildings. However, in positions remote from the emitter 1, the radio frequency signals received by the receiver 4 may be due to refraction over roof tops. The algorithm can allow for this in the prediction of location.

It will be apparent that this system would also work if the emitter and receiver elements were interchanged such that a number of fixed transmitters each of known power and location would permit a mobile receiver to be located.

The system described above is appropriate for all frequencies of radio signals that satisfy the following criteria:

(i) measurements must be taken more than a wavelength apart (ii) measurements are taken greater than 5 wavelengths from the emitter location; and (iii) the radiation is not absorbed excessively in objects located between the emitter and the receiver.

For these reasons, this is likely to limit usable frequencies to between 10 MHz and 5 GHz. It will be apparent that for radio frequency signals that do not satisfy these criteria, the predicted location of the emitter 1 may not be accurate.

In a further embodiment of the invention, the radio field 3 is sampled at a number of points in the environment (as described above) and the values correlated with the computed field from the assumed location of the emitter 1. The principle is that a 'cost function' is established primarily on the degree of correlation between the observed field and the computed electro-magnetic field from the assumed location of the emitter 1. The assumed location of the emitter 1 is adjusted until the 'cost function' is minimised. Numerous standard methods are already available to optimise this process, for example, fusion processes and meta-heuristics. This method is strongly dependent upon knowledge of the propagation loss, hence detailed information of the intervening terrain, culture and buildings becomes increasingly important.

The calculation of the derived field uses tools which are appropriate to the frequency range of interest. The method is not frequency dependent. The first test position can be established as the intersection of the surface of constant field strength derived from each observation point. The surface for each point is computed from the appropriate propagation prediction tool and the detail of the terrain. The selection of the first test location is not critical and could be replaced by a random process. However, the later method may take a long time to stabilise on a low value of 'cost function'.

It will be appreciated that in the first embodiment described above propagation loss is based upon only the physical distance. However, it should be noted that the power n in the loss $\alpha$ range$^n$ appears not very important over the range 2 to 6.

The system also requires a known location of measurement point, a series of possible emitter locations (from which the distance can be simply calculated). The method could be further improved with receive antenna polar pattern.

It will be appreciated that the system of the second embodiment will be more accurate and require fewer measurement points. Propagation loss is evaluated explicitly by using a terrain map and an appropriate propagation model.

This requires a known location of measurement point, i.e. the location of the receiver, a series of possible directions in which the emitter may lie, the topology of the intervening ground between measurement point and possible emitter location (from the terrain map), the frequency, antenna heights, emitter power and antenna efficiency. The method can be further improved by utilising ground conductivity maps, receive antenna polar pattern, building data including is physical dimensions and materials used.

It will be appreciated that the emitters 1 referred to in the above embodiments need not be mobile telephone handsets but can be any emitter, fixed or mobile capable of emitting a radio frequency signal at least in the frequency range disclosed above. The emitters may be hand held or vehicle mounted and may be covert or merely in capable of transmitting their specific location.

It will be appreciated that the system described above need not be limited to the use described above. For example, the system described could be used for location of personnel lost at sea or in arctic conditions.

The invention claimed is:

1. A system for locating an emitter emitting a radio frequency signal in a radio field, the system comprising:
    a movable receiver capable of detecting and recording an amplitude of the radio frequency signal from a plurality of locations within radio field;
    means for generating a grid of points representing an area of interest within the radio field;
    means for calculating the distance between each of the grid points and the plurality of receiver locations;
    means for calculating an expected signal strength for each of the grid points based on an assumed power and radiation efficiency of the emitter; and
    means for generating a prediction of the location of the emitter.

2. A system for locating an emitter according to claim 1, further comprising additional moveable receivers each capable of detecting and recording the amplitude of the radio frequency signal from a plurality of locations.

3. A system for locating an emitter according to claim 1, further comprising a means for detecting the position of the receiver including a GNSS or GPS receiver.

4. A system for locating an emitter according to claim 1, wherein the receiver continuously detects and records the amplitude of the radio frequency signal whilst moving within the environment of the radio field.

5. A method of locating the position of an emitter emitting a radio frequency signal in a radio field, the method comprising the steps of:
    (a) positioning a receiver in the radio field;
    (b) recording the amplitude of the emitted signal at the receiver location;
    (c) recording the receiver location;
    (d) repositioning the receiver at a second location;
    (e) recording the amplitude of the emitted signal at the second receiver location;
    (f) recording the receiver location;
    (g) generating a grid of points representing an area of interest within the radio field;
    (h) calculating the distance between each of the grid points and the receiver locatios;
    (i) calculating an expected signal strength for each of the grid points based on an assumed power and radiation efficiency of the emitter; and
    (j) generating a prediction of the location of the emitter.

6. A method according to claim 5, further comprising the step of:
    repeating steps (a) through (f) for a plurality of receiver locations.

7. A method according to claim 5, wherein steps (a) to (d) are carried out on two or more receivers.

8. A computer program product comprising program code means stored on a computer readable medium for performing the following method steps when the program is run on a computer and/or other processing means associated with suitable recording and locating devices;

(a) positioning a receiver in the radio field;
(b) recording the amplitude of the emitted signal at the receiver location;
(c) recording the receiver location;
(d) repeating steps (a) to (c) for a plurality of receiver locations in the radio field;
(e) generating a grid of points representing an area of interest within the radio field;
(f) calculating the distance between each of the grid points and receiver locations;
(g) calculating an expected signal strength for each of the grid points based on an assumed power and radiation efficiency of the emitter; and
(h) generating a prediction of the location of the emitter.

* * * * *